United States Patent [19]

Meeker

[11] Patent Number: 4,607,433

[45] Date of Patent: Aug. 26, 1986

[54] MARK LOCATOR

[75] Inventor: David M. Meeker, Saratoga, Calif.

[73] Assignee: American Envelope Company, Chicago, Ill.

[21] Appl. No.: 723,336

[22] Filed: Apr. 15, 1985

[51] Int. Cl.[4] .............................................. G01B 5/14
[52] U.S. Cl. .................................... 33/1 BB; 33/1 B; 33/563; 235/495
[58] Field of Search ............... 33/1 B, 1 BB, 562, 563, 33/565, 180 R, 1 F, DIG. 9; 235/495

[56] References Cited

U.S. PATENT DOCUMENTS

| | | | |
|---|---|---|---|
| 3,760,506 | 9/1973 | Tudberry | 33/1 BB |
| 3,845,278 | 10/1974 | Rex, Jr. | 33/495 |
| 3,863,051 | 1/1975 | Wilcoxon | 235/495 |
| 4,178,503 | 12/1979 | Corwin | 235/495 |
| 4,422,241 | 12/1983 | Meeker | 33/1 BB |
| 4,464,841 | 8/1984 | McCay et al. | 33/1 BB |
| 4,475,288 | 10/1984 | Pellegrom | 33/1 B |

Primary Examiner—Willis Little
Attorney, Agent, or Firm—McDougall, Hersh & Scott

[57] ABSTRACT

A transparent plastic mark locator for determining compliance of indicia with postal specifications. The locator is a rectangular transparent plate with three perpendicular locating edges. Indicia on the plate define areas for location of postal specification information and codes including three alternative Facing Identification Mark patterns for use in a defined "FIM" print area.

5 Claims, 1 Drawing Figure

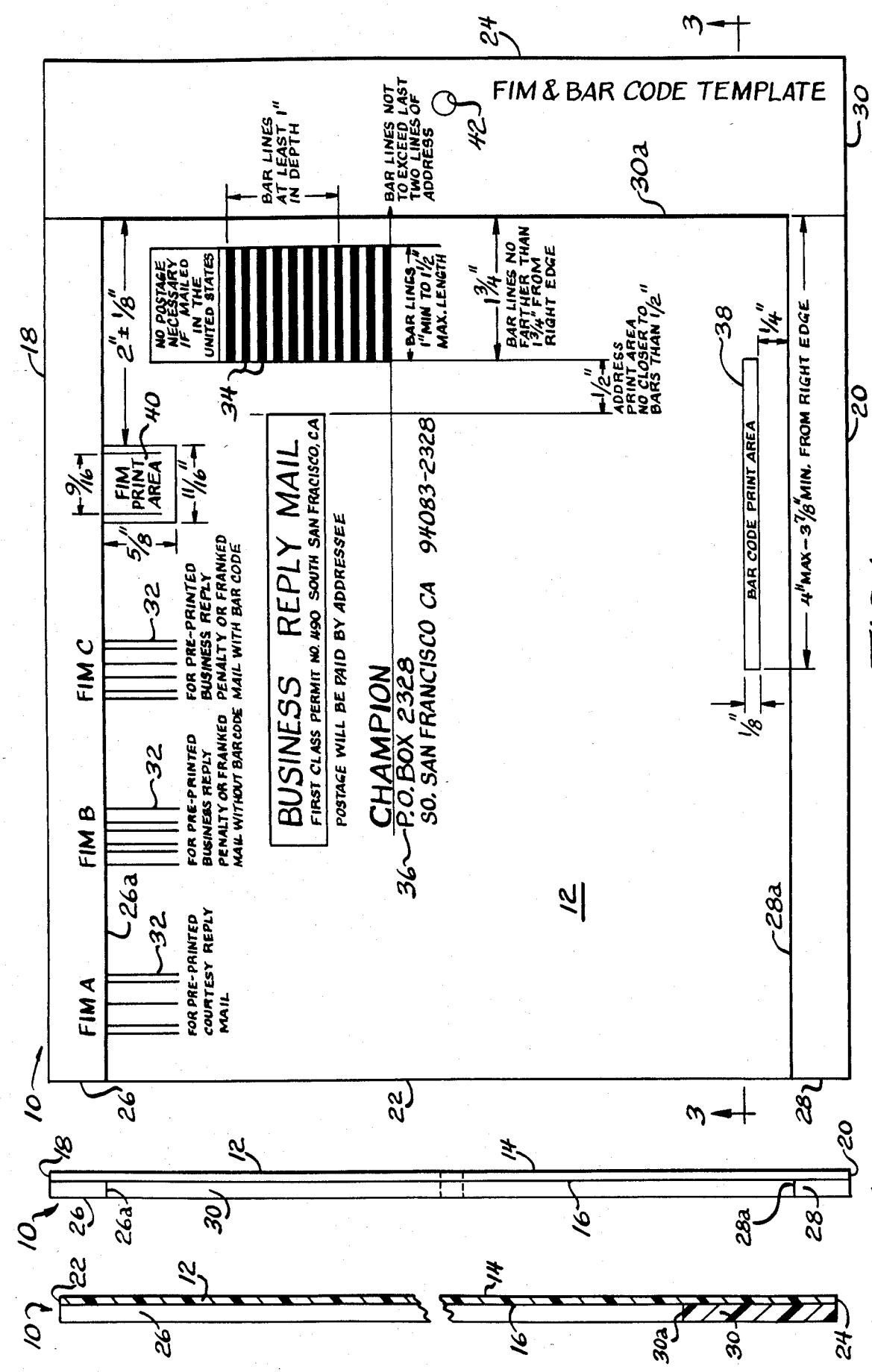

MARK LOCATOR

BACKGROUND OF THE INVENTION

This invention relates to a mark locator for determining the proper arrangement of printed indicia on the address side of preprinted reply mail and the like. It is specifically designed to insure compliance with Post Office Publication 12 (March 1984) and Post Office Publication 25 (March 1984), of the United States Postal Service.

A mark locator which includes a transparent plate with edge surfaces depending from the lower surface of the plate was the subject matter of U.S. Pat. No. 4,422,241 issued to the inventor on Dec. 27, 1983. Since that time, the above noted publications have made alternative "FIM Pattern" or Facing Identification Mark requirements and the mark locator of the instant invention is a means of insuring that pre-printed reply mail has the proper alternative pattern in the required "FIM" print area and in proper relation to the edges of the mail piece and the other critically located indicia.

The Facing Identification Mark is a vertical bar code in the top portion of the address side of the envelope or card and functions as an orientation mark for automatic facing and cancelling equipment. There are three alternative FIM patterns: FIM "A" pre-printed for courtesy reply mail, FIM "B" for pre-printed business reply penalty or franked mail without bar code and FIM "C" for pre-printed business reply penalty or franked mail with bar code. One of these alternatives is printed in the "FIM" print area and checked with the novel FIM and bar code template or mark locator of the invention. The mail printing machinery may be adjusted when the indicator shows the necessity.

Other patents involving locating templates and position indicators or gauges known to the inventor are U.S. Pat. Nos.: 1,189,277; 2,375,427; 3,266,162; 3,705,294; 3,760,506; 3,863,051; and, 4,149,070.

SUMMARY OF THE INVENTION

A mark locator or template is provided to determine whether the markings on an article of mail conform to the appropriate alternative specifications. More, particularly, the invention relates to a mail locator which, when placed on the surface of an article having alternative markings to be checked, is easily located in proper orientations relative to the article of mail and gives easily read visual indications of whether the markings satisfy the appropriate alternative specifications.

The mark locator has indicia thereon for verifying conformity of markings of a mail article as being within the dimensional limits of postal specifications, said markings including a plurality of alternative series of parallel lines of predetermined width, length and spacing. The locator includes a rectangular transparent plate having opposed top and bottom edges and opposed side edges as well as a front and a back surface. The front and back surfaces are parallel and planar.

Perpendicularly oriented first, second and third edge members comprising members of rectangular cross-section are fixed to the back surface of the plate adjacent and parallel to three edges of the rectangular plate. The edge members lie in first, second and third planes, respectively, substantially perpendicular to a plane containing the back surface.

Indicia are provided on the transparent plate at predetermined locations defining a plurality of specified areas relative to the first, second and third planes. The plate also includes a plurality of three alternative series of parallel lines of predetermined width, length and spacing for alternative use in one of the specified areas.

As used in this application, the terms "top," and "bottom," "front" and "back" are intended to facilitate the description of the mark locator. Thus, such terms are merely illustrative of one common orientation of the locator and are not intended to limit the locator to any specific orientation.

BRIEF DESCRIPTION OF THE DRAWINGS

FIG. 1 is a front plan view illustrating a mark locator in accordance with the present invention;

FIG. 2 is a side elevational view of the mark locator of FIG. 1;

FIG. 3 is a cross-sectional elevational view taken along the line 3—3 of FIG. 1.

DETAILED DESCRIPTION OF THE PREFERRED EMBODIMENT OF THE INVENTION

In FIGS. 1 to 3 of the drawings, which except for "length" in FIG. 3 are intended to be to scale, like numerals are used to designate like parts and the numeral 10 generally designates the mark locator or template of the invention.

The locator 10 comprises a single rectangular transparent plastic plate 12 having a front surface 14 and a back surface 16, both of which are planar and parallel with each other.

The plate 12 has top edge 18, bottom edge 20, and opposed left side edge 22 and right side edge 24 (as seen in FIG. 1). Elongated plastic edge members 26, 28 and 30 of rectangular cross-section extend along, adjacent to and parallel to the length of top edge 18, bottom edge 22 and right side edge 24 and are fixed to the back surface 16 by a suitable adhesive. The inside edges 26a, 28a and 30a of the edge members 26, 28 and 30, respectively, lie in first, second and third planes, respectively which are substantially perpendicular to each other and to a plane containing the back surface 16.

Indicia are provided on the transparent plastic plate 12 in the form of graphically dimensioned boxes showing location, orientation, and dimensional tolerances for different U.S. Postal service specified "FIM" and bar code requirements.

The "FIM" bars 32 must be $\frac{5}{8}''\pm\frac{1}{8}''$ long. They may bleed over the edge of the rectangular article of mail adjacent plane 26a, but must have a minimum of $\frac{1}{2}''$ visible on the article face. The far right bar of "FIM", in the print area, must be within $2''\pm\frac{1}{8}''$ from the right edge of the article adjacent plane 30a. The top of the "FIM" bars must be within $\frac{1}{8}''$ of top edge of the article adjacent plane 26a. The horizontal identification bars 34 must be at least 1" in depth, but not extend below the top of the delivery address line 36. The bars 34 should be between 1/16" and 3/16" thick and spaced 1/16" and 3/16" apart. Bars 34 should be at least 1" in length but not longer than $1\frac{1}{2}''$. The maximum distance from the left edge of the bars 34 to the right edge of the article is $1\frac{3}{4}''$. An allowance of $\frac{1}{2}''$ clearance between the column of bars 34 and any other address printed indicia is required. At least 1" between the left edge of the article of mail and the delivery address line 36 is required.

A bar code read area 38 ($\frac{5}{8}''\times 4\frac{1}{2}''$) must be kept clear of all printing other than the properly printed bar code.

The bottom of the bar code must be ¼"±1/16" from the bottom of the article of mail. The first bar in the bar code area 38 must be 4" max. to 3⅞" min. from right side edge of the article.

In addition to these U.S. Postal Service specifications, three alternative "FIM" codes "FIM A," "FIM B" and "FIM C" are printed to the left of the "FIM" print area 40 along the top edge 18 of the article of mail adjacent the plane 26a of the mark locator. One of the "FIM" codes is placed within the specified "FIM" print area dimensioned box 40 and regardless of which, the relative spacing may be checked by the "FIM A," "FIM B" and "FIM C" alternative spacing patterns. This is done either before or after the other indicia orientations are checked to ensure that all indicia are correctly located and the correct "FIM" is used for the article of mail in question, whether it is a printed courtesy reply piece, a business reply penalty or franked mail without bar code or a business reply penalty or franked mail with bar code.

A suitable hole 42 for hanging the mark locator 10 for storage may be provided through the plate 12 and member 30.

What is claimed is:

1. A mark locator having indicia thereon for verifying conformity of markings of a mail article as being within the dimensional limits of postal specifications, said markings including a plurality of alternative series of parallel lines of predetermined width, length and spacing, comprising:

a rectangular transparent plate having opposed top and bottom edges and opposed side edges and having a front and a back surface, said front and back surfaces being parallel and planar;

first, second and third, perpendicularly oriented edge members comprising members of rectangular cross-section fixed to the back surface of said plate adjacent and parallel to three edges of said rectangular plate and lying in first, second and third inner planes, respectively, substantially perpendicular to a plane containing said back surface; and indicia provided on said plate at predetermined locations defining a plurality of specified areas relative to said first, second and third planes, said plate including a plurality of alternative series of parallel lines of predetermined width, length and spacing for alternative use in one of said specified areas.

2. The mark locator of claim 1 in which the members are of plastic fixed to the back surface by adhesive.

3. The mark locator of claim 1 in which said one of said specified areas into which said alternative series of parallel lines is used is a dimensioned box adjacent the inner plane of one of the members of rectangular cross-section.

4. The mark locator of claim 1 in which a hole for hanging storage is provided through the plate.

5. A mark locator for use on articles of mail requiring a particular one of a plurality of facing identification marks comprising means for orienting a transparent plate relative to two adjacent edges of a rectangular article of mail, first indicia means defining a facing identification mark print area adjacent one of the two edges of said article on said transparent plate, a plurality of different and alternative indicia means defining a plurality of different and alternative facing identification marks to check the number length and spacing of whichever of the plurality of facing identification marks is properly to be printed within the print area defined by said first indicia means, said plurality of different and alternative indicia means being adjacent the same one of the two edges of said article on said transparent plate as is said first indicia means.

* * * * *